United States Patent [19]
Cho

[11] Patent Number: 5,974,519
[45] Date of Patent: Oct. 26, 1999

[54] ADDRESS RE-DESIGNATE CIRCUIT FOR MICROCONTROLLER

[75] Inventor: Dong-Soo Cho, Seoul, Rep. of Korea

[73] Assignee: LG Semicon Co., Ltd., Cheongju, Rep. of Korea

[21] Appl. No.: 08/865,935

[22] Filed: May 30, 1997

[30] Foreign Application Priority Data

Jul. 15, 1996 [KR] Rep. of Korea ...................... 96/28506

[51] Int. Cl.⁶ .................................................... G06F 12/10
[52] U.S. Cl. .............................................. 711/202; 710/9
[58] Field of Search .................................... 711/202, 211, 711/221; 395/823, 829; 710/3, 9

[56] References Cited

U.S. PATENT DOCUMENTS 3,949,380   4/1976   Barbour et al. .............................. 710/3
5,699,542  12/1997   Mehata et al. .......................... 711/202

*Primary Examiner*—Eddie P. Chan
*Assistant Examiner*—Kevin L. Ellis
*Attorney, Agent, or Firm*—Fleshner & Kim

[57] ABSTRACT

An improved address re-designate circuit for a programmable microcontroller which is capable of arbitrarily selecting a peripheral circuit and re-designating an address corresponding to the selected peripheral circuit has the advantage of easily being programmed since the user can arbitrarily select a peripheral circuit disposed in the microcontroller chip according to a desired function and can re-designate an address thereof.

12 Claims, 7 Drawing Sheets

EVACHIP

| FIXED ADDRESS | PERIPHERAL CIRCUIT |
|---|---|
| 1 | A |
| 2 | B |
| 3 | C |
| 4 | D |
| 5 | E |

A~E: PERIPHERAL CIRCUIT

TARGET MICROCONTROLLER A1

| ADDRESS | PERIPHERAL CIRCUIT |
|---|---|
| 1 | B |
| 2 | A |
| 3 | D |

TARGET MICROCONTROLLER A2

| ADDRESS | PERIPHERAL CIRCUIT |
|---|---|
| 1 | C |
| 2 | D |
| 3 | E |
| 4 | G |

FIG. 6C
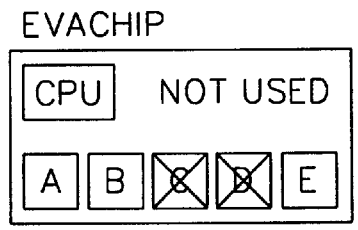
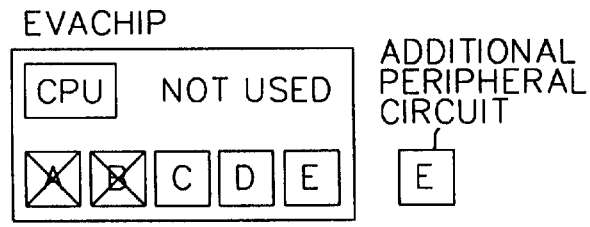
FIG. 6D
| PERIPHERAL CIRCUIT | ADDRESS BUS | RE-DESIGNATE ADDRESS BUS |
|---|---|---|
| B | 1 | 2 |
| A | 2 | 1 |
| E | 3 | 5 |
| PERIPHERAL CIRCUIT | ADDRESS BUS | RE-DESIGNATE ADDRESS BUS |
|---|---|---|
| C | 1 | 2 |
| B | 2 | 1 |
| E | 3 | 5 |
| G | 4 | −(IPD) |

# ADDRESS RE-DESIGNATE CIRCUIT FOR MICROCONTROLLER

BACKGROUND OF THE INVENTION

1. Field of the Invention

The present invention relates to a function of a microcontroller, and in particular, to an address re-designate circuit for a microcontroller which is capable of re-designating an address of a built-in peripheral circuit.

2. Description of the Prior Art

As shown in FIG. 1, a conventional microcontroller includes a memory device 102 for storing a program or data, an address decoder 103 for decoding an address and allocating it to peripheral circuits(104-1~104-N), and a central processing unit(CPU) 101 for executing the program stored in the memory 102 and outputting control signals(RD)(WE) to the peripheral circuits(104-1~104-N). These elements are interconnected with a data bus and an address bus.

The operation of a conventional address re-designate circuit will now be described in detail.

When the microcontroller is equipped in an apparatus to execute an operation, the CPU makes a chip enable signal (CE) active and the memory 102 is enabled to thereafter execute a program contained in the memory 102.

Here, the CPU 101 outputs an address for setting the peripheral circuits 104-1~104-N.

Then, when the address decoder 103 decodes the address (ADDR) to allocate to the peripheral circuit 104-1~104-N, the CPU outputs a control signal(RD,WE) so that a corresponding peripheral circuit receives data and executes a corresponding function.

The microcontroller which carries out the above-described operation can be connected to an emulator, as shown in FIG. 2.

That is, when a user inputs a key to carry out a program, a controller 111 executes the program stored in a first memory 112 and drives a microcontroller 114.

Here, the microcontroller 114 executes the program stored in the memory device 102 to generate an address, and the address decoder 103 receiving the address sequentially sets the peripheral circuits 104-1~104-N.

Then, the CPU outputs the control signals(RD,WE) to operate the corresponding circuit among the peripheral circuits 104-1~104-N, and as a result, the corresponding circuit receives data from the data bus to perform a corresponding function. Here, the data resulting from the function execution is stored in a second memory 113.

Afterward, when the user inputs a key for checking an executing state of a function while carrying out a program, the controller 111 stops the operation of the microcontroller 114.

Here, when the user inputs a key for checking the execution of an arbitrary function, the controller 111 reads out a corresponding data among the data stored in the second memory 113 to output the read data to a monitor(not illustrated).

Then, the user checks the data on the screen of the monitor(not illustrated) and judges an executing condition of the corresponding function.

However, according to the conventional art, since the address of a peripheral circuit built in the microcontroller is fixedly allocated, the user disadvantageously cannot re-designate the address arbitrarily.

That is, as shown in FIG. 2, when a microcontroller is equipped in the emulator for programming, an EVA-CHIP must be provided for supporting a new microcontroller when a program for a microcontroller having a previously unknown combination of peripheral circuits is being developed.

Therefore, to the user's disadvantage, it takes much time and high cost to fabricate the EVA-CHIP and the development of a targeted microcontroller and preparation of the software for using the microcontroller must be performed at the same time.

SUMMARY OF THE INVENTION

Accordingly, it is an object of the present invention to provide an improved address re-designate circuit for a microcontroller which is capable of facilitating program development by permitting a programmer to arbitrarily select a peripheral circuit and re-designating an address corresponding to the selected peripheral circuit.

To achieve the above object, there is provided an improved address re-designate circuit for a microcontroller which includes a memory device for storing a program or data, an address re-designate unit for converting and re-designating an address and outputting a control signal for disabling non-selected peripheral circuits among a plurality of peripheral circuits, an address decoder for receiving and decoding the control signal from the address re-designate unit and allocating the reset address to a corresponding peripheral circuit among the plurality of peripheral circuits, and a central processing unit for executing a program stored in the memory device and controlling the plurality of peripheral circuits.

The address re-designate unit includes an address input unit for receiving a corresponding address among addresses loaded on an address bus, an address converting unit for converting the address inputted to the address input unit and outputting a control signal for disabling non-selected peripheral circuits among the plurality of peripheral circuits, and an address output unit for outputting a re-designate address converted in the address converting unit to the address decoder.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A through 6D are diagrams of an address re-designate process in the circuit of FIG. 3 according to the present invention.

DETAILED DESCRIPTION OF THE INVENTION

The address re-designate circuit for a microcontroller according to the present invention will now be described in detail with reference to the accompanying drawings.

Figure 1:
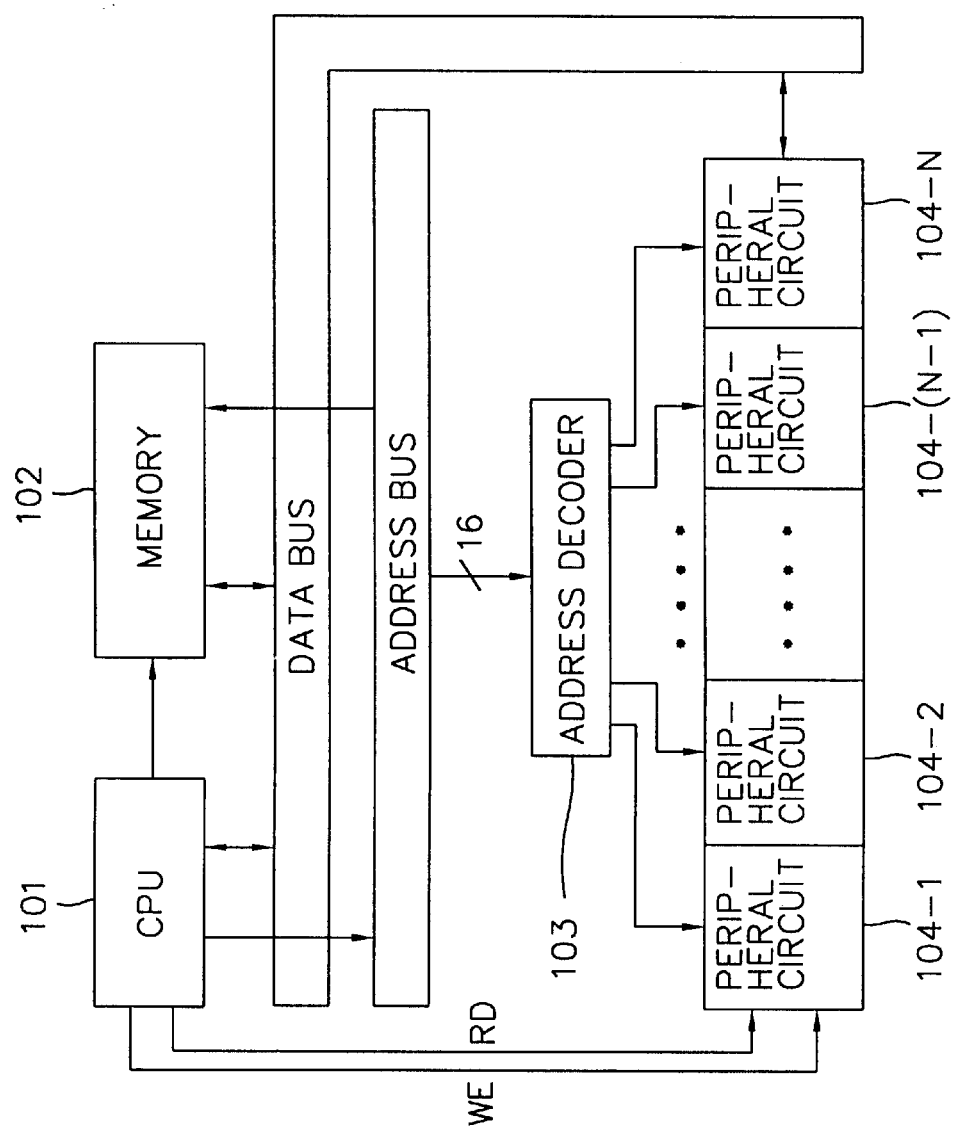
FIG. 1 is a schematic block diagram of a microcontroller according to the conventional art.
Figure 2:
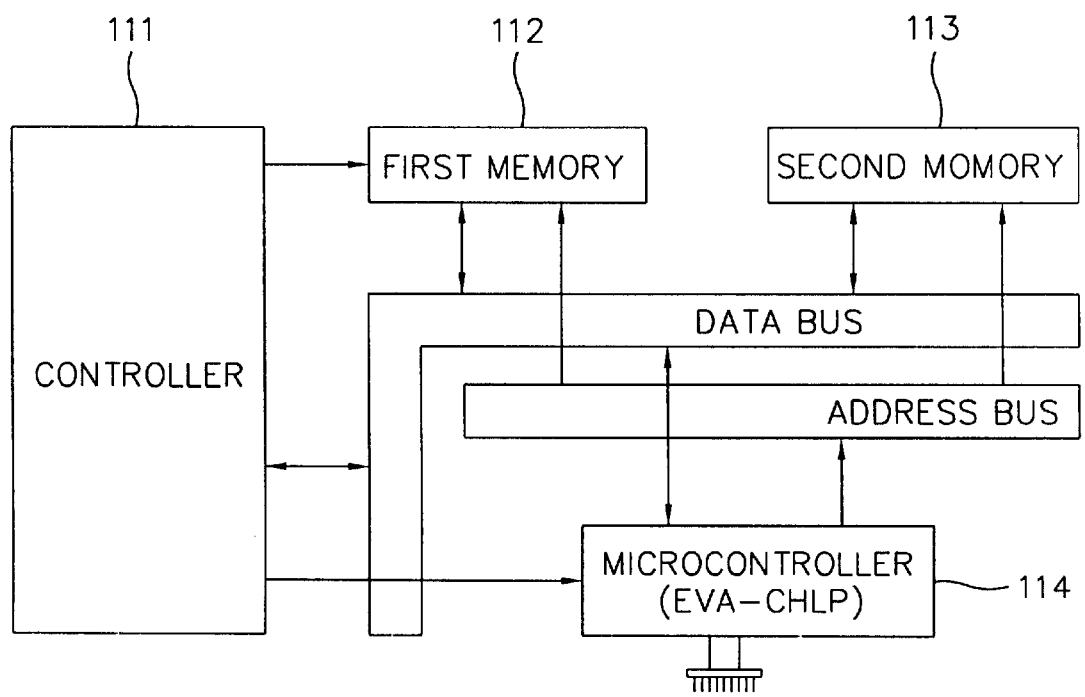
FIG. 2 is a block diagram showing a conventional emulator.
Figure 3:
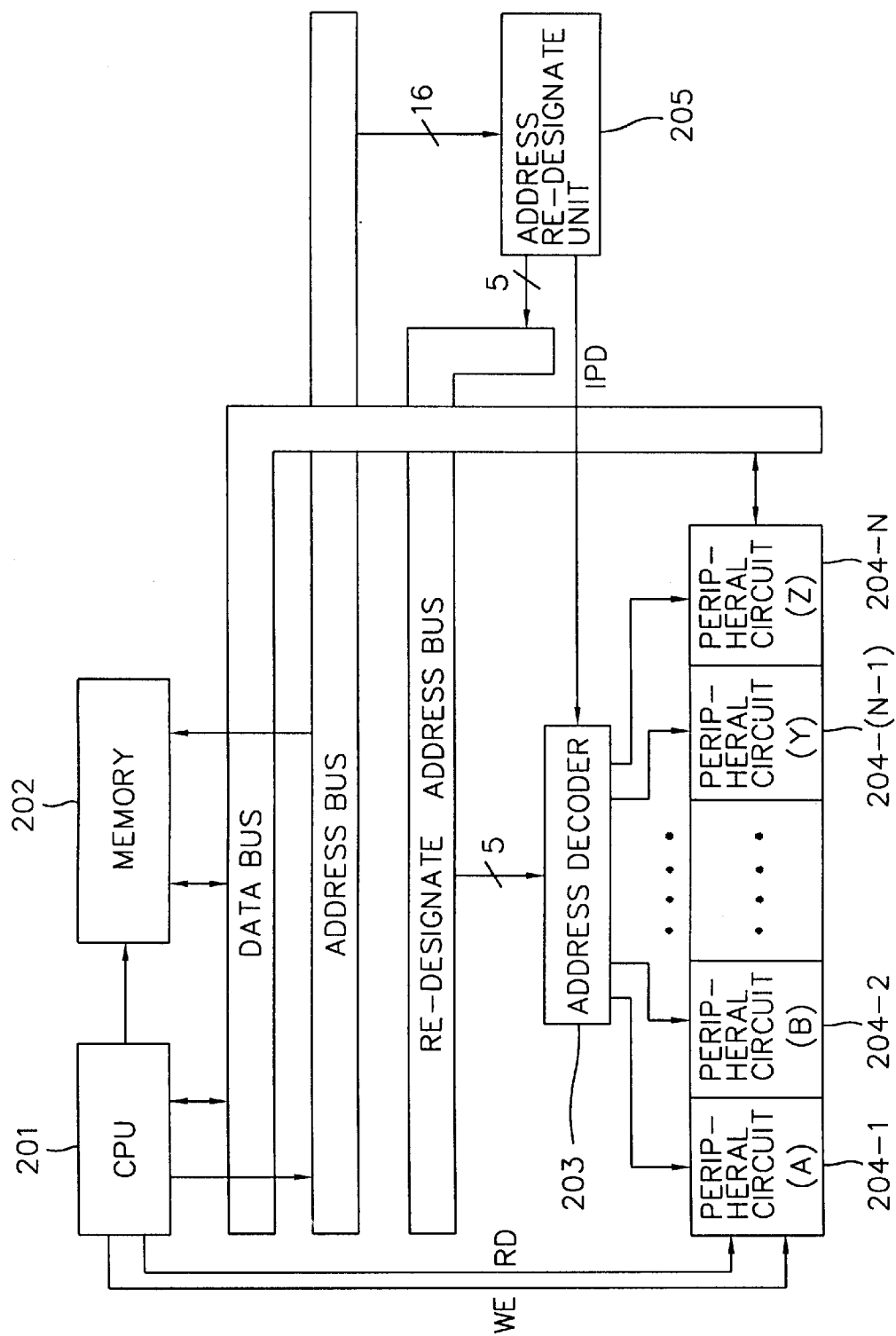
FIG. 3 is a schematic block diagram of an address re-designate circuit for a microcontroller according to the present invention.

FIG. 3 is a schematic block diagram showing the address re-designate circuit for a microcontroller according to the present invention which includes a memory device 202 for storing a program or data, an address re-designate unit 205 for converting and re-designating an address(ADDR) and outputting a control signal(IPD) for disabling non-selected peripheral circuits among a plurality of peripheral circuits (204-1~204-N), an address decoder 203 for receiving and decoding the control signal from the address re-designate unit 205 and allocating it to a corresponding circuit among the plurality of peripheral circuits 204-1~204-N, and a central processing unit 201 (hereinafter, called CPU) for executing a program stored in the memory device 202 and outputting control signals (RD,WE) to the plurality of peripheral circuits 204-1~204-N.

Figure 4:
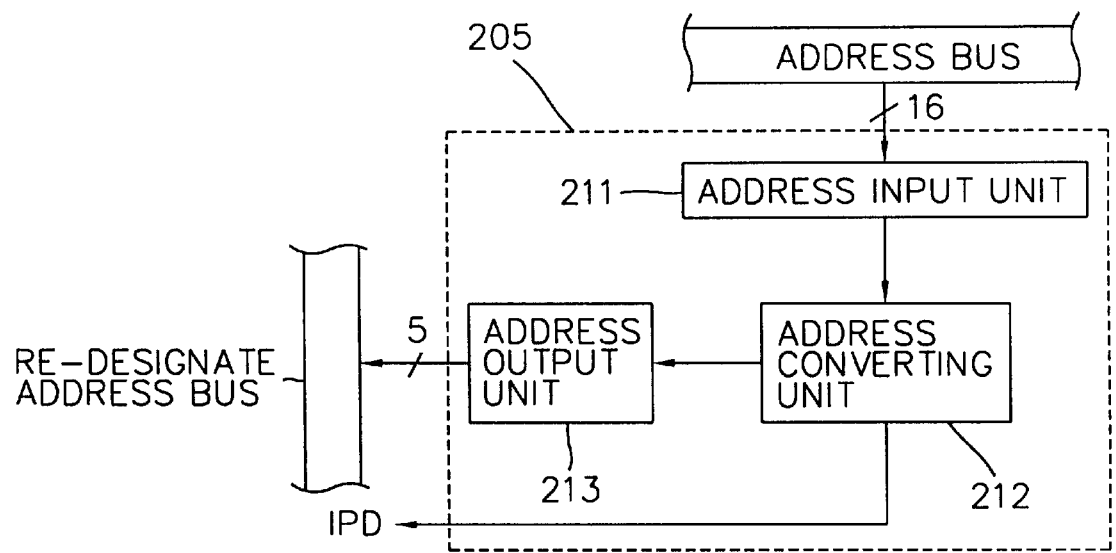
FIG. 4 is a schematic block diagram of an address re-designate unit in the circuit of FIG. 3.

As shown in FIG. 4, the address re-designate unit 205 includes an address input unit 211 for selectively receiving a corresponding address among the addresses(ADDR) loaded on an address bus, an address converting unit 212 for converting an output signal from the address input unit 211 and outputting the control signal (IPD) to the address decoder 203 for disabling non-selected peripheral circuits among the plurality of peripheral circuit 204-1~204-N, and an address output unit 213 for outputting an output signal from the address converting unit 212 to the address decoder 203 via a re-designated address bus.

The operation and effect of the present invention will now be described in detail.

First, when inputting an information data for selecting a specific peripheral circuit among the peripheral circuits 204-1~204-N mounted in a chip to embody a desired function, the address re-designate unit 205 converts an address(ADDR) outputted from the address bus and outputs the address corresponding to the selected specific peripheral circuit via the re-designated address bus.

That is, when the user selects the peripheral circuits 204-2,204-7 and re-designates them to be addresses (ADDR1,ADDR2), the CPU 201 executes a program stored in the memory 202 and outputs an address(ADDR) for setting the peripheral circuits 204-1~204-N.

Here, in the address re-designate unit 205, when the address input unit 211 selects from the address bus and outputs the address for setting the peripheral circuits 204-2,204-7, the address converting unit 212 converts re-designate addresses (ADDR1,ADDR2) and outputs the control signal(IPD) to the address decoder 203 for disabling the other non-selected peripheral circuits except the peripheral circuits 204-2,204-7 and outputs the converted addresses to the address output unit 213.

Figures 6A, 6B:
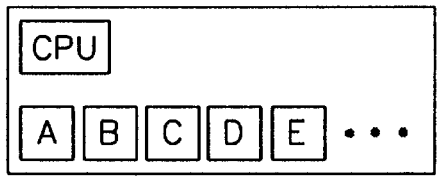

As shown in FIGS. 6A through 6D, assuming that the address signals from the peripheral circuits A, B, C, D and E installed in the microcomputer are fixed to 1, 2, 3, 4, and 5, the address re-designate unit 205, as shown in FIG. 6B, re-designates the address signals from the peripheral circuits which, as shown in FIG. 6D, are differently designated with respect to a corresponding microcomputer, as fixed address signals as shown in FIG. 6A.

At this time, the re-designate address bus is known as an address bus for designating the address re-designated by the address re-designate unit 205.

Accordingly, the address decoder 203 receiving the control signal(IPD) from the address re-designate unit 205 decodes the re-designate addresses(ADDR1,ADDR2) to set the peripheral circuits 204-2,204-7.

Then, the CPU 201 outputs the control signals(RD,WE) and the peripheral circuits 204-2,204-7 receive corresponding data from the data bus to carry out the corresponding function.

Figure 5:
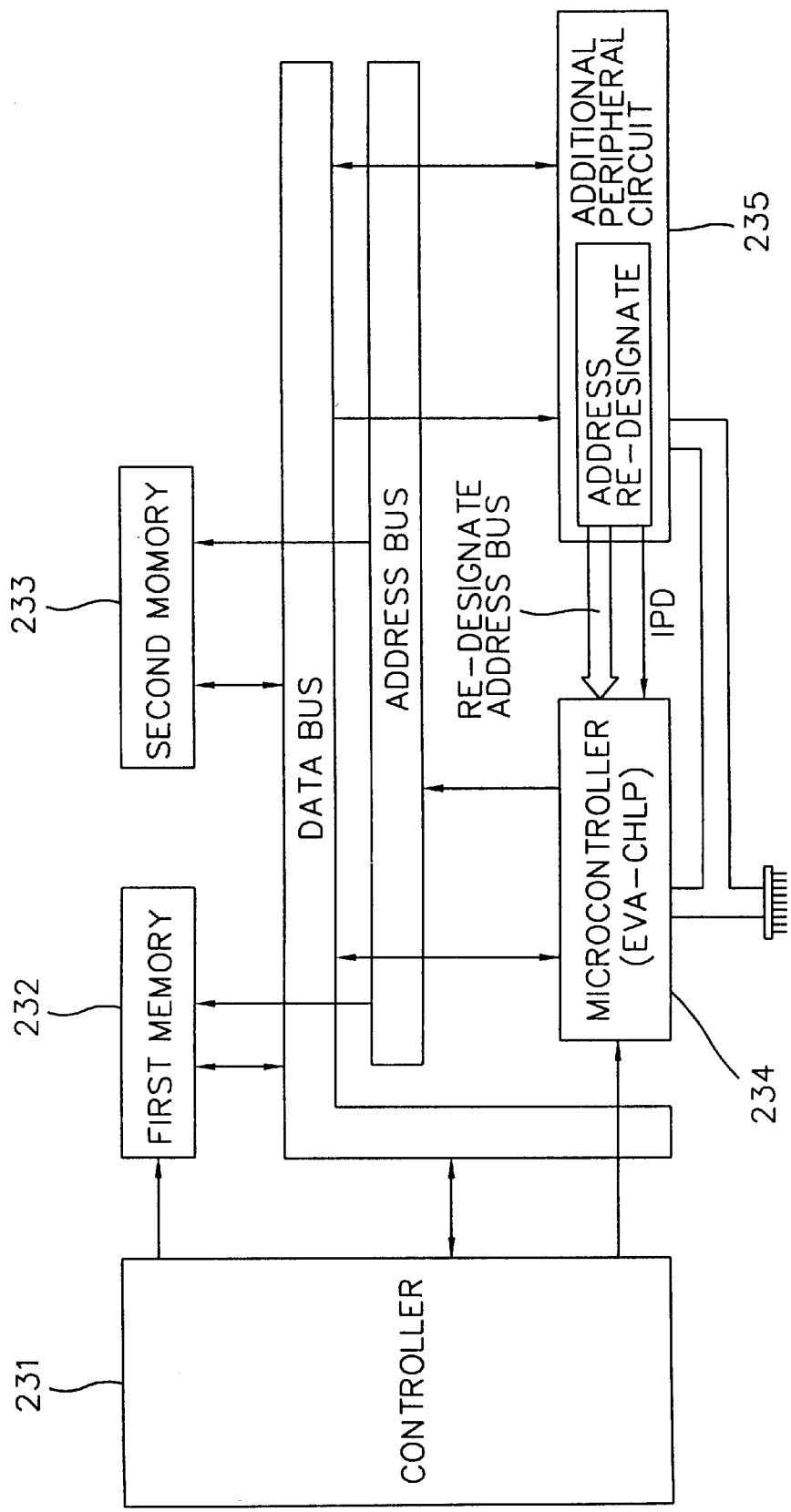
FIG. 5 is a schematic block diagram of an emulator according to the present invention.

The above-described microcontroller of the present invention may connected to an emulator for developing a program, as shown in FIG. 5.

That is, when the user inputs a key command for programming, a controller 231 executes the program stored in a first memory 232 to drive a microcontroller 234.

Here, an address re-designate unit 235 receives and re-designates an address for a selected specific peripheral circuit among the peripheral circuits 204-1~204-N mounted in the microcontroller 234 to output the address to the microcontroller 234.

Then, the microcontroller 234 executes a program stored in the memory 202 by the CPU 201 to generate an address, and the address decoder 203 receiving the address sequentially sets a specific peripheral circuit among the peripheral circuits 204-1~204-N.

Next, the CPU 201 outputs control signals(RD,WE) to operate a corresponding peripheral circuit among the peripheral circuits 204-1~204-N. Then the corresponding peripheral circuit receives data from the data bus to operate a corresponding function. Here, the data obtained by a function execution is stored in a second memory 233.

Afterward, when the user inputs a key command to check an executing condition of a corresponding function during programming, the controller stops the operation of the microcontroller 234.

Here, if the user inputs a key command to check an executing condition of an arbitrary function, the controller reads out a corresponding data among the data stored in the second memory 233 and outputs the read data on the monitor(not illustrated).

Then, the user checks the data displayed on the screen of the monitor(not illustrated) to judge the executing condition of the corresponding function.

As described in detail above, the present invention has the advantage of easily programming the microcontroller since the user can arbitrarily select a peripheral circuit disposed in the chip according to a desired function and can re-designate an address.

Therefore, when the present invention is adopted, an emulator can be embodied which is required in developing an applied program of a microcontroller having a combination of a new previously unknown peripheral circuit, and thereby the time and cost for the development of software can be economized.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An address re-designate circuit for a microcontroller, comprising:

memory means for storing a program or data;

address re-designate means for re-designating an address to an arbitrary re-designate address and outputting a control signal for disabling non-selected peripheral circuits among a plurality of peripheral circuits;

address decoding means for receiving and decoding the control signal from the address re-designate means and allocating the arbitrary re-designate address to a corresponding peripheral circuit among the plurality of peripheral circuits; and a central processing unit (CPU) for executing a program stored in the memory means and controlling the plurality of peripheral circuits.

2. The circuit of claim 1, wherein the address re-designate means comprises:

address input means for receiving a corresponding address among addresses loaded on an address bus;

address converting means for converting the address received by the address input means into the arbitrary re-designate address and outputting the control signal for disabling non-selected peripheral circuits among the plurality of peripheral circuits; and address output means for outputting the arbitrary re-designate address converted in the address converting means to the address decoding means.

3. The address re-designate circuit of claim 1, wherein the arbitrary re-designate address is selectable by a user.

4. The address re-designate circuit of claim 1, wherein the arbitrary re-designate address can correspond to any one of the plurality of peripheral circuits at a prescribed time.

5. The address re-designate circuit of claim 4, wherein an additional peripheral circuit is connected to the microcontroller and controlled by the CPU, wherein the arbitrary re-designate address corresponds to the additional peripheral circuit.

6. An address re-designate unit, comprising:

an address input unit coupled to an address bus, wherein said address input unit selectively receives an address from among a plurality of addresses;

an address converting unit coupled to said address input unit, wherein said address converting unit re-designates the address from said address input unit, wherein the address converting unit further generates a control signal, said control signal for disabling non-selected peripheral circuits from a plurality of peripheral circuits;

an address output unit coupled to said address converting unit, wherein said address output unit receives the re-designated address from said address converting unit and generates an output signal; and a re-designated address bus coupled to said address output unit, wherein said re-designated address bus receives the output signal from said address output unit.

7. The address re-designate unit of claim 6, wherein an address decoder is coupled to said re-designated address bus and receives the re-designated address from said re-designated address bus.

8. An address re-designate circuit of a microcontroller, comprising:

a memory that stores at least one of a program and data;

a plurality of peripheral circuits each designated a default address;

a central processing unit (CPU) that controls each of the plurality of peripheral circuits, wherein the CPU executes the program stored in the memory, and wherein the program uses a first subset of the plurality of peripheral circuits;

an address re-designate unit that re-designates one of a set of first addresses to each of the first subset of peripheral circuits and outputs a control signal that disables the remaining peripheral circuits, and wherein the default address does not equal the first address for at least one peripheral circuit of the plurality of peripheral circuits;

an address decoder that receives and decodes the control signal from the address re-designate unit and allocates an input address to a corresponding peripheral circuit.

9. The circuit of claim 8, wherein the peripheral circuits and the microcontroller are on the same chip.

10. The circuit of claim 8, wherein the default address is a fixed address for each of the plurality of peripheral circuits.

11. The circuit of claim 8, wherein the address re-designate circuit is external to the microcontroller.

12. The circuit of claim 8, wherein the set of first addresses map to the memory.

* * * * *